United States Patent
Sharma et al.

(10) Patent No.: US 10,423,521 B2
(45) Date of Patent: Sep. 24, 2019

(54) AUTOMATICALLY EXECUTING STATELESS TRANSACTIONS WITH DATA DEPENDENCY IN TEST CASES

(71) Applicant: salesforce.com, inc., San Francisco, CA (US)

(72) Inventors: Tuhin Kanti Sharma, San Mateo, CA (US); Michael Bartoli, San Francisco, CA (US); Christopher Tammariello, San Mateo, CA (US); Ashish Patel, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 183 days.

(21) Appl. No.: 15/686,020

(22) Filed: Aug. 24, 2017

(65) Prior Publication Data
US 2019/0065349 A1    Feb. 28, 2019

(51) Int. Cl.
*G06F 11/00*   (2006.01)
*G06F 11/36*   (2006.01)

(52) U.S. Cl.
CPC ...... *G06F 11/3684* (2013.01); *G06F 11/3688* (2013.01)

(58) Field of Classification Search
CPC ............ G06F 11/3684; G06F 11/3688
See application file for complete search history.

(56) References Cited

U.S. PATENT DOCUMENTS

| | | | |
|---|---|---|---|
| 2005/0166094 A1* | 7/2005 | Blackwell | G06F 11/3664 714/38.14 |
| 2012/0259576 A1* | 10/2012 | Thulasidasan | G06F 11/3684 702/123 |
| 2013/0117611 A1* | 5/2013 | Chakraborty | G06F 11/3672 714/33 |

\* cited by examiner

*Primary Examiner* — Joshua P Lottich
(74) *Attorney, Agent, or Firm* — Wong & Rees LLP; Zhichong Gu

(57) ABSTRACT

A test case data set that includes test step data sets is received. The test step data sets include a first test step data set that specifies a dependency data field. Test step objects to be used to execute test steps in a test case are generated based on the test step data sets. The test steps include a first test step to be executed using a first test step object generated based on the first test step data set. The first test step object is used to execute the first test step. The first test step as executed populates values in the dependency data field. The values in the dependency data field are accessed and used in a second test step in the test steps while the second test step is being executed using a second test step object in the test step objects.

24 Claims, 8 Drawing Sheets

Test Case Data Set 202

> Test Step (1) Specific Data Set 204-1
>
> Test step specific type
> Step number
> Expected time limit
> Test step specific data field(s)
> Dependency data field(s)
> Replaceable override data field(s)

> Test Step (2) Specific Data Set 204-2
>
> Test step specific type
> Step number
> Expected time limit
> Test step specific data field(s)
> dependency data field(s)
> Replaceable override data field(s)

⋮

> Test Step Common Data Set 206
>
> Test case information
> Test case owner information
> Replaceable data field identifier(s)
> Agent information

*FIG. 2A*

AUTOMATICALLY EXECUTING STATELESS TRANSACTIONS WITH DATA DEPENDENCY IN TEST CASES

TECHNICAL FIELD

The present invention relates generally to executing test cases against systems under test, and in particular, to automatically executing stateless transactions with data dependency in test cases.

BACKGROUND

A computing system that processes massive volumes of transactions and interactions may comprise numerous software and hardware components distributed across a large number of computing nodes and networks. To verify that the system performs correctly and responsively, extensive and sophisticated testing need to be performed against some or all the components in the system regularly, on demand, or in development.

Typically, specific test code is written in various programming languages such as JAVA, C#, C++, etc., to support specific test cases against a system under test. If the system is developed by many developers and used by many users, the test code need to be designed, written and itself tested over and over again through tightly coupled cooperative and handholding efforts involving numerous people, organizations, and development teams. As the system evolves over time with new features, new components and new bug fixes, test code development efforts, preparing test data, coordinating different stakeholders in testing, and so forth, can consume significant personnel and non-personnel resources.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 2A illustrates an example test case data set.

DESCRIPTION OF EXAMPLE EMBODIMENTS

Figure 1A:
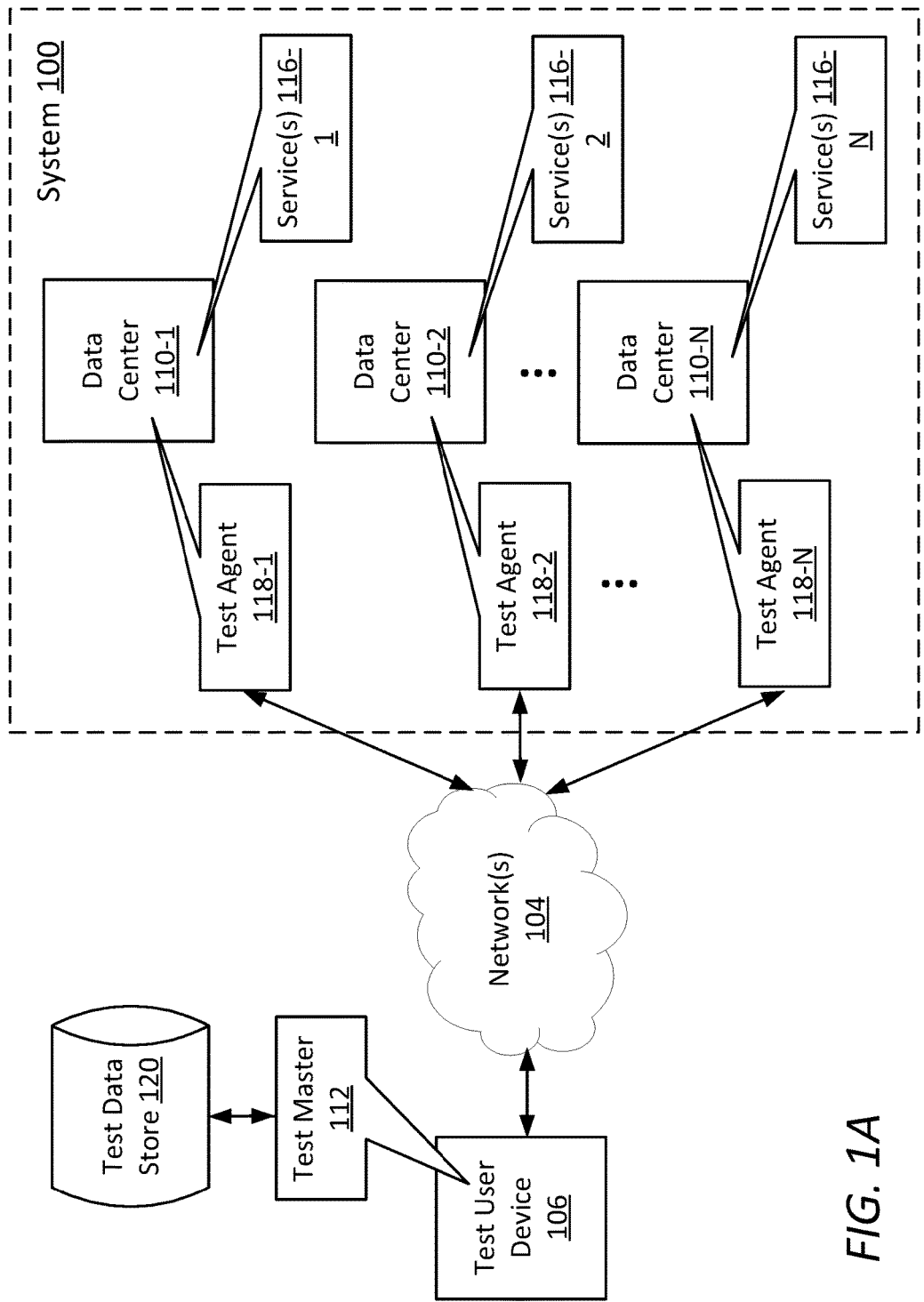
FIG. 1A illustrates an example stateless test execution framework comprising a test master and test agents.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:
 1.0. General Overview
 2.0. Functional Overview
  2.1. Stateless Text Execution Framework
  2.2. RESTful Endpoints
  2.3 Test Definition Data and Test Data
  2.4. Test Case Data
  2.5 Data File Example
  2.6 Generic and Specific Test Cases
  2.7. Test Case Generator
  2.8 Dependency Relationship
 3.0. Example Embodiments
 4.0 Implementation Mechanism—Hardware Overview
 5.0. Extensions And Alternatives

1.0 General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Under techniques as described herein, a test data model can be used to specify or define test case data sets. These test case data sets can be used to generate test case objects for executing corresponding test cases against a system under test. The system under test may, but is not limited to, represent a complicated computing system such as a cloud-based computing system that supports massive volumes of concurrent and sequential transactions and interactions. The test data model as described herein can be used to avoid writing customized test code that consumes significant resources to develop and maintain. In addition, the test data model can be used to facilitate testing systems in development as well as in production.

The test case data sets may be generated by a test master or by a test user interacting with the test master, sent or submitted by the test master to a test agent, for example using Hypertext Transfer Protocol (HTTP) or Representational State Transfer (REST) requests, and forwarded to the test agent for the purpose of executing the test cases. Any of the test master and the test agent can be deployed with any computing node in a public cloud, in a private cloud, in a combination of one or more public clouds and one or more private clouds, and so forth. In some embodiments, the test master and the test agent implement a stateless test execution framework, in which the test agent maintains its own test execution state for a test requested by the test master while the test is being executed by the test agent, without the test agent having to share the test execution state with the test master. Example test master, test agents, stateless test execution framework, and so forth, can be found in U.S. patent application Ser. No. 15/685,964, with an application title of "STATELESS SELF-SUFFICIENT TEST AGENTS" by Ashish Patel, Chris Tammariello, Michael Bartoli, Tuhin Kanti Sharma, and Vaishali Nandal, filed on Aug. 24, 2017, the entire contents of which are hereby incorporated by reference as if fully set forth herein.

A test case data set that represents a test case may be specified or defined to comprise one or more test step data sets. Each test step data set in the one or more test step data sets represents a respective test step to be executed for the test case. The test step data sets may be used by the test agent to queue and execute, at runtime, the test steps represented by the test step data sets. Example test step execution can be found in U.S. patent application Ser. No. 15/686,005, with an application title of "CONTROLLING EXECUTIONS OF SYNCHRONOUS AND/OR NON-SYNCHRONOUS OPERATIONS WITH ASYNCHRONOUS MESSAGES" by Chris Tammariello, Ashish Patel, Tuhin Kanti Sharma, and Michael Bartoli, filed on Aug. 24, 2017, the entire contents of which are hereby incorporated by reference as if fully set forth herein.

The test steps in the test case may comprise related test steps, or unrelated test steps. As used herein, related test steps refer to (1) (depended) test steps that generate test data depended on by other test steps, and (2) (depending) test steps that depend on test data generated by other test steps. In contrast, unrelated test steps refer to test steps that do not have data dependency relationships between or among the test steps.

Under techniques as described herein, a test user can specify/define dependency relationships among the related test steps in the test case as dependency data fields in the test case data set that represent the test case. For example, the test use can define the dependency data fields within a test step data set that represents a depended test step to indicate that values should be extracted (e.g., through a search pattern such as a regular expression or "regex", etc.) from test results of the depended test step to populate the dependency data fields.

At runtime, the dependency data fields in the depended test step data set provides a signal to the test agent to extract the values from the test results of the depended test step. The values of the dependency data fields extracted from the test results of the depended test step can live or exist beyond the depended test step so that other test steps such as subsequent test steps to the depended test step can access these values of the dependency data fields even after the depended test step has completed its test execution.

Dependency relationships between related test steps in a test case as represented in the test data model as described herein enable the test agent to execute a workflow, which would otherwise need user interactive input at runtime to guide the test case along the workflow.

Under techniques as described herein, the workflow in the test case can be defined and carried out without actually affecting specific methods of execution within any test step in the test case. By way of example but not limitation, the test case may choose to execute two related test steps with two independent API calls such as HTTP or REST API calls respectively. The first API call in the first test step (of the two related test steps) is independent of the second API call in the second test step (of the two related test steps). For instance, the second API call is not invoked by, or implemented as a part of, the first API call; thus, the second API call would not receive input data from the first API call through API call invocation. Conversely, the first API call is not invoked by, or implemented as a part of, the second API call; thus, the first API call would not receive input data from the second API call through API call invocation.

As this example illustrates, even though the test steps in the test case can choose their respective methods of execution, test data that is needed by a depending test step from a depended test step can be specified or modeled as dependency data field(s), for example in a test step data set representing the depended test step. In the present example, a test step data set representing the first test step with the first API call may be specified with one or more dependency data fields representing the data needed by other test steps such as the second test step with the second API call. At runtime, values are extracted from test data available in the first test step such as test results obtained by the first API call. These values may be used to populate the one or more dependency data fields and made available outside the first test step to the other test steps such as the second test step with the second API call. As a result, the values of the dependency data fields made available under techniques as described herein can be used as input data to the second API call, without altering the methods of execution with any of the test steps including the first and second test steps in the test case.

Thus, under techniques as described herein, a workflow or an overall stateful transaction in a test case can be performed (e.g., automatically, without user interactive input at runtime, etc.) based at least in part on dependency relationships specified in the test data model among different test steps that may execute stateless transactions, such as operations associated with HTTP or REST APIs, operations associated with a test automation tool, operations associated with a web browser automation tool, Message Transfer Agent (MTA) operations, and so forth. As used herein, the term "stateless transaction" may refer to a transaction or operation that does not itself persist or pass on its results to any later transaction or operation. Example stateless transactions may include, but are not necessarily limited to only, any of: independent API calls, operations associated with a test automation tool, operations associated with a web browser automation tool (e.g., Selenium, etc.), operations associated with MTA, and so forth. In some embodiments, stateless transactions as described herein are completely unrelated, and can be executed/performed completely independent of (or stateless with) one another. However, a test case that includes these stateless transactions may have a semantics that some or all of the stateless transactions should be executed with specific data dependency relationships. While these stateless transactions can be executed on their own completely independently, the test case will fail for missing the dependency relationships unless the stateless transactions are automatically executed under techniques as described herein in a way that the dependency relationships are respected or followed.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2.0 Functional Overview 2.1 Stateless Text Execution Framework

FIG. 1A illustrates an example stateless test execution framework comprising a test master 112 and one or more test agents (e.g., 118-1, 118-2, 118-3, etc.). This framework can be used to run a wide variety of focused and/or extensive tests against software and/or hardware components in system 100. Example systems may include, but are not necessarily limited to: any of: multitenant data service systems, web-based systems, systems that support massive volumes of concurrent and/or sequential transactions and interactions, database systems, and so forth.

In some embodiments, system 100 may comprise one or more data centers 110-1, 110-2, ... 110-N, where N is a positive integer. Each of data centers may comprise respective software and/or hardware components to be tested by the test cases. Data center 110-1 deploys first services 116-1; data center 110-2 deploys second services 116-2; data center 110-N deploys N-th services 116-N. Other software and/or hardware components, assets, and so forth, of system 100 may be hosted in or outside these data centers, and may serve as test target under techniques as described herein. As used herein, a service may refer to a service with an HTTP interface, or a service with a non-HTTP interface. Additionally, optionally or alternatively, services that serve as test targets under techniques as described herein may be deployed anywhere, not necessarily inside data centers.

As used herein, the term "software components" may refer to one or more of: services with HTTP interfaces, services with non-HTTP interfaces, mobile applications, web-based applications, browser-based applications, user interfaces, plug-ins, APIs, operating systems, software libraries, computer executable codes, related non-executable data, application software, system software, embedded software, device drivers, microcode, computer clustering software, server processes, web servers, backend servers, database servers, databases, and so forth. The term "hardware components" may refer to one or more of: CPUs, controllers, microprocessors, FPGAs, ASICs, ICs, network processors, firmware, chipsets, interconnects, buses, RF integrated chips, graphic processors, computer memory, fixed and removable storage media, peripherals, and so forth.

Under techniques as described herein, test master 112 and test agents (e.g., 118-1, 118-2 ... , 118-N, etc.) operate within a stateless framework that is agnostic to specific network setups. The one or more computer networks 104 through which test master 112 and test agents (e.g., 118-1, 118-2 ... , 118-N, etc.) communicate may refer to any combination of one or more of: the Internet; intranets, extranets, virtual private networks (VPNs), local area networks (LANs), wide area networks (WANs), wireless networks, wireline networks, client-server, mobile networks, public networks, carrier-class networks, access networks, enterprise networks, proprietary networks, or the like.

Test master 112 can be deployed at a test user device 106, which represents a computer device that may or may not co-located with any of the test agents (e.g., 118-1, 118-2 ... , 118-N, etc.). Example test user devices may include, but are not necessarily limited to only, any of: a computer server, a handheld computing device, a mobile device, a wearable device, a laptop computer, a work station, a desktop personal computer, a PDA, a cell phone, a tablet, a PC, or any device or any computing device capable of interfacing directly or indirectly to test agents as described herein for the purpose of running test cases against software and/or hardware components under test in system 100. In some embodiments, test master 112 may be deployed on any device which supports a JAVA virtual machine (JVM). Additionally, optionally or alternatively, test master 112 may be hosted on one or more server devices that host or provide one or more data repositories such as relational or non-relational databases for storing test related data. In some embodiments, test master 112 can be hosted on a web server and can be accessed through HTTP or REST endpoints.

The test agents (e.g., 118-1, 118-2 ... , 118-N, etc.) can receive test execution requests from test master 112, and then execute tests as requested by the test execution requests in complete independence of test master 112. Final test statuses and related test results of the requested tests may be made available or sent to test master 112, for example, as responses to the test execution requests.

For example, to execute a specific test against specific software and/or hardware components under test in system 100, test master 112 retrieves test definition data and test data for the test from a test data store 120. Test master 112 can further identify a set of one or more candidate test agents that are configured to execute the test, for example based on agent configuration and status data retrieved from an accessible data store such as test data store 120. Example agent configuration and status data may include, but is not necessarily limited to only, any of: test capabilities of test agents in relation to the specific test, locations of test agents in relation to the specific test in relation to locations of the software and/or hardware components under test, etc.

Test master 112 can select any test agent in the set of candidate test agents to execute the test, and send a request for executing the test to the selected agent over one or more computer networks 104. The request for executing the test includes, but is not necessarily limited to only, any initial test data needed by the recipient test agent for scheduling and executing the test.

In response to receiving the request for executing the test, the test agent (e.g., 118-1, 118-2 ... , 118-N, etc.) performs a series of operations to carry out the requested test. In some embodiments, the series of operation is performed by the test agent (e.g., 118-1, 118-2 ... , 118-N, etc.) without further interactions between the test agent (e.g., 118-1, 118-2 ... , 118-N, etc.) and test master 112 after the request for executing the test was received.

The series of operations performed by the test agent (e.g., 118-1, 118-2 ... , 118-N, etc.) independently may include, but are not necessarily limited to only, one or more of: determining a set of test cases to be run in the test, determining a time schedule for executing each test case in the test, determining a complete set of test steps for each test case in the test, determining a complete set of test data used to initiate or execute the complete set of test steps for each such test case, executing the complete set of test steps for each such test case with the complete set of test data, generating a final test execution status for each such test case, causing the final test execution status and related test results for each such test case to be made available or returned to test master 112, and so forth.

Under the stateless test execution framework as described herein, once the request for the test is received by the test agent (e.g., 118-1, 118-2 ... , 118-N, etc.), no coupling or interaction between the test agent (e.g., 118-1, 118-2 ... , 118-N, etc.) and test master 112 is needed for the test agent (e.g., 118-1, 118-2 ... , 118-N, etc.) to carry out executing the test. Even if test master 112 fails or otherwise becomes incommunicado with the test agent (e.g., 118-1, 118-2 ... , 118-N, etc.), the test agent (e.g., 118-1, 118-2 ... , 118-N, etc.) requested to perform the test can continue to schedule and execute all the test cases in the test, and carry out executing these test cases to their respective completions. When a new instance of test master 112 starts up or an existing instance of test master 112 recovers, test master 112 can send a new request to retrieve the final test execution status and the related test results for each test case in the test previously requested by a prior reincarnation of test master 112.

For the purpose of illustration only, FIG. 1A depicts a test agent for each data center. It should be noted, however, that in general, test agents may be deployed in same or different locations other than those implying a one-to-one relationship with data centers. In various embodiments, zero, one, or more test agents may be deployed at a data center. For example, a test agent pool comprising multiple test agents of similar capabilities may be deployed at a data center. Additionally, optionally or alternatively, another data center may be devoid of any locally deployed test agent. In some embodiments, a test agent at a data center may be used to test software and/or hardware components in system 100. In some embodiments, a test agent remote to a data center may be used to test software and/or hardware components in system 100. In some embodiments, test agents may be deployed at likely locations where potential users of system 100 are located so that functionality (or logic) and/or responsiveness can be tested with respect to certain software and/or hardware components in system 100.

2.2 Restful Endpoints

Figure 1B:
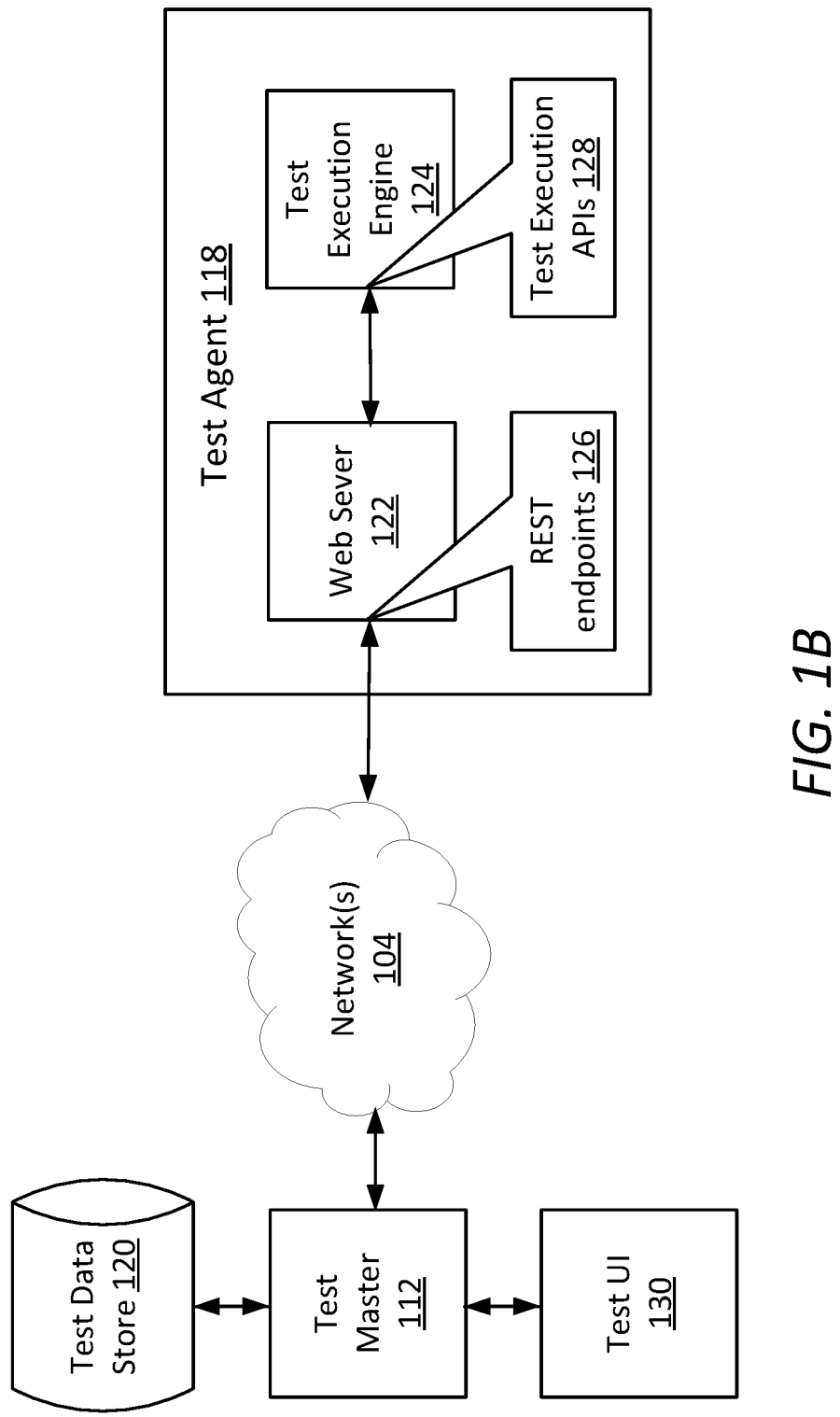
FIG. 1B illustrates an example test agent that interacts with test master for executing tests.

FIG. 1B illustrates an example test agent 118 that interacts with test master 112 for executing tests. As illustrated, test agent 118 comprises or implements a web server 122 and a test execution engine 124. Test execution engine 124 implements test execution functionality such as scheduling tests, executing tests, updating tests and test cases therein, reporting test execution statuses and results, and so forth. The test execution functionality implemented by the test execution engine 124 of test agent 118 may be exposed to web server 122 as one or more test execution Application Programming Interfaces (APIs) 128.

Test execution API calls 128 (e.g., implemented as HTTP-based RESTful APIs, etc.) exposed to web server 122 by test execution engine 124 may be indirectly exposed by web server 122 as HTTP-based endpoints/resources such as RESTful endpoints 126. These RESTful endpoints 126 are addressable by a web application or a web browser on any device directly or indirectly capable of establishing a web-based data connection with web server 122, including but not limited to: test master 112, another instance of test master 112 on a different device, and so forth.

Each of RESTful endpoints 126 may be addressable with an HTTP-based REST request including but not necessarily limited to only the following data items: a corresponding base Universal Resource Locator (URL) such as "https://txapi.force.com/resources/" that identifies a REST resources location for test execution; an internet media type that defines REST state transition data elements for test execution such as JSON, a XML file, a flat file database, and so forth; a standard HTTP method such as OPTIONS, GET, PUT, POST, and DELETE; etc.

In some embodiments, some or all of the RESTful endpoints may be publicly accessible. In some embodiments, some or all of the RESTful endpoints may be accessible by test master 112 through one or more private, proprietary, and/or specifically provisioned, data connections. In some embodiments, some or all of the RESTful endpoints may require authentication and/or authorization. One or more authentication and/or authorization mechanisms that can operate with HTTP or HTTP-based REST operations can be used before an API call can be successfully invoked indirectly by an HTTP request from test master 112 to web server 122. In some embodiments, some or all of the endpoints invoke API calls that execute tests accessing one or more of: test and/or production data owned by a service provider, test and/or production data owned by a user system of a service provider, data maintained at a specific data center or data store, data maintained at multiple data centers or data stores, and so forth.

At runtime, test master 112 may determine/select a RESTful (test execution) endpoint for scheduling a specific test to be executed by test agent 118. For instance, test master 112 may determine a set of data items to be included with an HTTP request such as the base URL of RESTful endpoints 126, a path (e.g., to be concatenated to the base URL, etc.) for the RESTful endpoint among the RESTful endpoints 126, REST state transition data elements (e.g., test definition data, test data, in JSON, in XML, in a flat file database format, etc.), a standard HTTP method of POST, and so forth.

Test master 112 generates an HTTP-based REST request based on a URL constructed from the base URL and the path, the REST state transition data elements (e.g., in JSON, in XML, in a flat file database format, etc.), the HTTP method, and so forth, and sends the HTTP-based REST request to web server 122 to cause web server 122 to invoke a call to a corresponding test execution API among test execution API 128 exposed to web server 122 by test execution engine 124.

In some embodiments, the HTTP-based REST request comprises test definition data that identifies the set of test cases, test steps in each test case in the set of test cases, test data to be used in each, some, or all of the test cases and/or the test steps in the test, and so forth. Some or all of the test definition data and the test data received as a part of the HTTP-based REST request from test master 112 may be passed to test execution engine 124.

The test may comprise a set of one or more test cases. For instance, a first test case in the test may be to execute one or more first test transactions and/or interactions with data center 110-1 of FIG. 1A; a second test case in the test may be to execute one or more second test transactions and/or interactions with data center 110-2 of FIG. 1A; a third test case in the test may be to execute one or more third test transactions and/or interactions with data center 110-1 of FIG. 1A.

In response to invoking the specific API call by web server 122, test agent 118-1, or test execution engine 124 therein, performs a series of operations to schedule and/or carry out the requested test, as previously discussed. In some embodiments, the series of operation is performed by the test agent (e.g., 118-1, 118-2 . . . , 118-N, etc.) without further interactions between the test agent (e.g., 118-1, 118-2 . . . , 118-N, etc.) and test master 112.

In some embodiments, a final test execution status and some or all of test results from executing the set of test cases of the test may be provided by test execution engine 124 as return code or return data in the call to the corresponding test execution API to web server 122. Web server 122 may cache/store the final test execution status and some or all of the test results as REST resources that can be accessed or retrieved through HTTP-based REST GET operations from the REST resources location of web server 122. Some or all of the REST resources cached/stored by web server 122, including but not necessarily limited to only the final test execution status and the test results, may be returned in an HTTP-based REST response (or simply HTTP response) to test master 112 in response to the HTTP-based REST request for the test.

If test master 112 fails or otherwise becomes incommunicado with test agent 118, the HTTP-based REST response sent by test agent 118, or web server 122 operating in conjunction with test agent 118, may fail to reach test master 112. In some embodiments, a new instance or a recovered instance of test master 112 or another test master (e.g., from the same test user device, from a different test user device, etc.) may retrieve information from HTTP-based REST responses by querying the REST resources cached/stored by web server 122 with HTTP-based REST request with GET methods/operations.

For example, the test master 112, after being restored or restarted, can issue a new HTTP-based REST request to receive a new HTTP-based REST response that comprises information in the failed HTTP-based REST response. For instance, the new HTTP-based REST request may be generated based on the base URL of RESTful endpoints 126, the same path (e.g., to be concatenated to the base URL, etc.) for the specific RESTful endpoint among the RESTful endpoints 126 that was used to request executing the test, a standard HTTP method of GET, and so forth.

2.3 Test Definition Data and Test Data

In some embodiments, test execution engine 124 may be implemented with computer code that performs test transactions and test interactions based on the test definition data and the test data forwarded by web server 122 in the API call invoked by web server 122. Example test transactions and test interactions may include, but are not necessarily limited to only, any of: transactions and interactions using production data (e.g., actual data generated by users, etc.), transactions and interactions using test data (e.g., synthesized data to cover special or general data values or special or general application logic, etc.), transactions and interactions using software and hardware components in a production environment, transactions and interactions using software and hardware components in a development environment, transactions and interactions involving user input, transactions and interactions between backend servers, any combination of the foregoing, and so forth.

Test definition data and test data can be used to enable a test agent to execute a test independent of a test master while the test is being executed. For example, test execution engine 124 may be used to execute one or more test cases that comprise test transactions and test interactions that simulate transactions and interactions supported by user applications that run on user systems and that are used by users to access the subscribed services. Data representing user input in the test may be provided as a part of the test data originally in REST data elements (e.g., in JSON, in XML, in a flat file database format, etc.) and forwarded in the API call to test execution engine 124. The REST data elements as described herein can be used to include complete replications of view forms, which might be otherwise entered by a test user by hand under other approaches. Thus, based on the complete replications of the view forms (e.g., with synthesized data designed to test specific value range or specific logic of system 100, etc.), the test execution engine 124 can store the complete replication of the view forms in memory after the HTTP request causes a corresponding test execution API to be invoked (or called), and execute test steps without going back to test master 112 for additional user input for the view forms.

To simulate the transactions and interactions comprising dependency relationships, the test definition data may identify a set of dependent and/or independent test steps for each test case to be run in the test. The test definition data may identify specific relationships between and/or among the test steps in terms of timing, data, and other dependencies.

In executing a test case, based on the test definition data and the test data, test execution engine 124 guides the test case through relatively controlled test execution paths that purposefully exercise specific logic under test that is supported or implemented by one or more software and/or hardware components in system 100.

For example, test execution engine 124 may perform a first test step of a test case to interact with a set of specific software and/or hardware components under test in system 100 to execute a specific API call implemented or performed by the specific software and/or hardware component(s) under test with specific test data portions received in the test data or generated in prior dependent test steps (prior to the first step). The specific software and/or hardware components under test may return a status code and other related information in the specific API call. Test execution engine 124 may analyze the status code and return information, and perform a second test step of the test case to interact with a new set of specific software and/or hardware components under test in system 100 to execute a new specific application programming interface (API) call with new specific test data portions received in the test data or generated in prior dependent test steps (prior to the second step). Thus, while executing the test case, for the purpose of guiding the test case through the predesignated test execution paths, test execution engine 124 can maintain test execution state information in relation to the test case independent of test master 112.

2.4 Test Case Data

FIG. 2A illustrates an example test case data set 202 that can be used to generate a test case object at runtime or in offline processing. Test case data set 202 may be a part or the whole of overall test case data (e.g., test definition data, test data, etc.) passed by a test master to a test agent. In embodiments in which the test case object is a test case base object representing a generic test case, the test case base object as generated based on test case data set 202 may be further expanded into multiple test case specific objects representing multiple specific test cases based on the overall test case data of which test case data set 202 is a part. Example test case expansion can be found in U.S. patent application Ser. No. 15/685,980, with an application title of "RUNTIME EXPANSION OF TEST CASES" by Ashish Patel, Tuhin Kanti Sharma, Chris Tammariello, and Michael Bartoli, filed on Aug. 24, 2017, the entire contents of which are hereby incorporated by reference as if fully set forth herein.

Under techniques as described herein, test cases involving diverse types of tests and diverse types of test subjects can be represented by test case objects generated based on the overall test case data in a data file, without any need to write test tool code for these test cases in a programming language such as JAVA, C#, C++, etc. The data file may be, without limitation, a human readable file, a binary data file, etc.

In some embodiments, the overall test case data for a test comprises (e.g., constitutes, etc.) one or more test case data sets (e.g., 202, etc.) for test cases in the test, and is defined/specified with a data description language or a data interchange format including but not limited to JavaScript Object Notation (JSON), a XML file, a flat file database, etc. A test user can interact with a test user interface (e.g., 130 of FIG. 1B, etc.) of a test master to generate, update and/or delete some or all portions of the overall test case data and the test case data sets therein, instead of or in addition to directly editing or authoring the data file comprising the test case data sets.

A test case data set such as 202 of FIG. 2A specifies/defines a set of test steps in a corresponding test case. In some embodiments, the test case as specified/defined in test case data set 202 represents a specific test case without further test case expansion. In some embodiments, the test case represents a generic test case which can be used to generate, through test case expansion, multiple specific test cases.

At runtime, a test step in the test case—or a test execution engine that executes the test step—can use test data received in the overall test case data and test results of any prior test steps to generate intermediate test data as needed. This allows the test execution engine as described herein to execute autonomously (e.g., with respect to the test master, etc.). The test execution engine can execute each test step of the test case (or each test step in a specific test case of multiple specific test cases expanded from the test case), generate any intermediate data needed to carry out each test step of the test case, and pass any intermediate data extracted from a prior test steps to later test step(s), without further interacting with a test master that made the original request for executing the test case while the test case (or the specific test case of the multiple specific test cases expanded from the test case) is being executed by the test execution engine.

As used herein, a test step (at runtime) may refer to the test execution engine that executes the test step or a component such as a test step object that is used by the test execution engine to execute the test step. For example, a prior test step (at runtime) may refer to the test execution engine that executes the prior test step or a component such as a test step object that is used by the test execution engine to execute the prior test step; later test step(s) (at runtime) may refer to the test execution engine that executes the later test step(s) or component(s) such as test step objects that are used by the test execution engine to execute the later test step(s).

Under techniques as described herein, the portions of the overall test case data as related to the test case represent test execution metadata used in a data-driven message-driven test execution model to (e.g., fully, completely, etc.) control workflows of test execution at runtime for the test case and the test steps therein. Example test execution models can be found in the previously mentioned U.S. patent application Ser. No. 15/686,005, with the application title of "CONTROLLING EXECUTIONS OF SYNCHRONOUS AND/OR NON-SYNCHRONOUS OPERATIONS WITH ASYNCHRONOUS MESSAGES."

Example test cases as described herein may include, but are not necessarily limited to only, synthetic web transactions against endpoints of web-based applications or services in order to measure and assess health and performance of the applications or services. In some embodiments, some or all of the synthetic web transactions can be developed and curated in the form of test case data sets by test users who own the applications or services and would like to have a particular level of monitoring for their applications or services.

As illustrated in FIG. 2A, test case data set 202 comprises one or more test step specific data sets (or simply test step data sets). The one or more test step data sets include but are not necessarily limited to only, specific data set 204-1 for test step 1, specific data set 204-2 for test step 2, . . . specific data set (not shown) for test step N, where N is a positive integer no less than one (1).

In some embodiments, each test step data set (e.g., 204-1, 204-2, . . . 204-N, etc.) in the one or more test step specific data sets comprises: a test step type; a step number, an expected time limit for executing the test step, test step specific data field(s), dependency data field(s), replaceable override data field(s), and so forth.

Additionally, optionally or alternatively, test case data set 202 may comprise a test step common data set 206. Test step common data set 206 may comprise: test case information, test case owner information, replaceable data field identifier(s), agent information, and so forth.

2.5 Data File Example

For the purpose of illustration only, an example test case data set 202 is defined/specified in a data interchange format (or a data description language) such as JSON as shown in TABLE 1.

TABLE 1

1.  "[testCase]": {
2.  "owner": {
3.  "teamName": "serviceTest",
4.  "email": "serviceTest@force.com"
5.  },
6.  "testSteps": [
7.  {
8.  "stepType": "API",
9.  "stepNumber": 1,
10. "timeout": 60,
11. "httpMethod": "POST",
12. "testUrl": "https://www.force.com/ws/oa/token",
13. "expectedResponseCode": 200,
14. "formParameters": {
15. "client_id": "clientId",
16. "client_secret": "secret",
17. "grant_type": "password",
18. "username": "user1@.force.com",
19. "password": "password"
20. },
21. "dependentResponseJsonData": {
22. "access_token": ""
23. },
24. "replaceableOverrides": [
25. {
26. "field": "formParameters",
27. "value": "rv1",
28. "overrideValue": "user1@rv1.com"
29. },
30. {
31. "field": "formParameters",
32. "value": "rv2",
33. "overrideValue": "user1@rv2.com"
34. },
35. {
36. "field": "formParameters",
37. "value": "rv3",
38. "overrideValue": "user1@rv3.com"
39. },
40. {
41. "field": "formParameters",
42. "value": "rv4",
43. "overrideValue": "user1@rv4.com"
44. },
45. {
46. "field": "formParameters",
47. "value": "rv5",
48. "overrideValue": "user1@rv5.com"
49. },
50. {
51. "field": "formParameters",
52. "value": "rv6", TABLE 1-continued

```
53.  "overrideValue": "user1@rv6.com"
54. },
55. {
56.  "field": "formParameters",
57.  "value": "rv7",
58.  "overrideValue": "user1@rv7.com"
59. },
60. {
61.  "field": "formParameters",
62.  "value": "rv8",
63.  "overrideValue": "user1@rv8.com"
64. },
65. {
66.  "field": "formParameters",
67.  "value": "rv9",
68.  "overrideValue": "user1@rv9.com"
69. },
70. {
71.  "field": "testUrl",
72.  "value": "rv32",
73.  "overrideValue": "https://rv32.force.com/rs/oa/token"
74. },
75. {
76.  "field": "testUrl",
77.  "value": "rv33",
78.  "overrideValue": "https://rv33.force.com/rs/oa/token"
79. },
80. {
81.  "stepType": "API",
82.  "stepNumber": 2,
83.  "timeout": 60,
84.  "httpMethod": "GET",
85.  "testUrl": "https://.force.com/rs/data/vxx.y",
86.  "expectedResponseCode": 200,
87.  "headers": {
88.   "Authorization": "Bearer"
89.  }
90. }
91. ],
92. "replaceableData": {
93.  "replaceableId": 2
94. },
95. "name": "oauthlogin",
96. "description": "Login to Force Endpoint using OAuth with User 1
      and check for 200 OK", "testCaseEnabled": true,
97. "period": 300,
98. "agents": [
99.  {
100.  "agentId": 1
101.  }
102. ]
103. }
```

The token "[testCase]" at line 1 in TABLE 1 represents a unique identifier assigned (e.g., by a test user, by a test team, by a test master, etc.) to test case data set 202. The unique identifier may be a string value of "synthetics\api\testcases\105" in a test case namespace that uniquely identifies a test case among possibly many test cases. It should be noted as before that the test case defined/specified by test case data set 202 may be a generic test case that can be further expanded into multiple specific test cases in some operational scenarios.

The example data file portion as shown in TABLE 1 for test case data set 202 comprises two test step data sets (e.g., 204-1, 204-2, etc.). Each of the two test step data sets (e.g., 204-1, 204-2, etc.) corresponds to a respective test step in the test case in the example test case data set 202. The first test step data set (e.g., 204-1, etc.) is specified/defined in lines 7 through 79 for the first test step of the test case. The second test step data set (e.g., 204-2, etc.) is specified/defined in lines 80 through 90 for the second test step of the test case.

The first test step specific data set (204-1) specifies for the first test step: a test step type (denoted as "stepType") of "API", a step number (denoted as "stepNumber") of "1", an expected time limit (denoted as "timeout") of 60 (e.g., in seconds, etc.), test step specific data fields in accordance with the test step type, and so forth.

The test step specific data fields in the first test step specific data set (204-1) for the first test step may include but are not necessarily limited to only, any of: an HTTP method (denoted as "httpMethod") with a value of "POST", a URL (denoted as "testUrl") with a value of "https://www.force.com/ws/oa/token", an expected response code (denoted as "expectedResponseCode") with a value of 200, a form parameter data field (denoted as "formParameters"), and so forth.

Some or all of test step specific data fields as described herein correspond to fields or components in HTTP or REST templates used for formulating the first and second HTTP or REST requests/responses.

For example, the HTTP method, the URL, the form parameter data field in the first test step specific data set (204-1) for the first test step may correspond to the same or similarly named fields or components in the first HTTP or REST request to be sent in the first test step. The expected response code 200 is an expected HTTP or REST response code to be received in the first HTTP response if the first test step is to be successfully executed with the expected time lime (e.g., 60 seconds, etc.) as specified.

In some embodiments, the form parameter data field ("formParameters") in the first test step specific data set (204-1) may comprise one or more form parameters such as a first form parameter (denoted as "client_id") with a value of "clientId", a second form parameter (denoted as "client_secret") with a value of "secret", a third form parameter (denoted as "grant_type") with a value of "password", a fourth form parameter (denoted as "username") with a value of "user1@force.com", a fifth form parameter (denoted as "password") with a value of "password", and so forth.

The first test step specific data set (204-1) also specifies for the first test step: zero or more dependency data fields. The dependency data fields can be used by test case data set 202 to signal to a recipient test agent what dependency data fields should be populated by values extracted from test results obtained in a specific test step and should be made available for later test steps to the specific test step to access the extracted values that populate the dependency data fields.

For the purpose of illustration only, one dependency data field "access_token" is shown in the first test step specific data set (204-1) in TABLE 1. More specifically, in the first test step, the value of the dependency data field "access_token" is to be extracted from test results obtained in the first test step. To do so, the test agent may use a search pattern such as a regular expression ("regex") to search for and extract a value for a dependency data field such as "access_token" from test results. The search pattern may be implemented (e.g., coded, etc.) in the test case object that represents the test case. Additionally, optionally or alternatively, the search pattern (not shown) may be specified in test case data set 202, for example in the first test step specific data set (204-1) as an attribute (not shown) associated with the dependency data field "access_token".

As illustrated in TABLE 1, the first test step specific data set (204-1) further specifies for the first test step: zero or more replaceable override data fields. In the present example, the form parameter field ("formParameters") and the URL data field ("testUrl") are identified as replaceable override data fields.

More specifically, in the form parameter data field ("formParameters") of the first test step specific data set (204-1) representing the first test step, the following override values are to be used (e.g., in any order, in sequential order, in random or non-random order, etc.) in the first test step: an override value of "user1@rv1.com", which can be referred to (e.g., in a test case object representing the test case, etc.) by an override value identifier of "rv1"; an override value of "user1@rv2.com", which can be referred to by an override value identifier of "rv2"; an override value of "user1@rv3.com", which can be referred to by an override value identifier of "rv3"; and so forth.

In the URL data field ("testUrl") of the first test step specific data set (204-1) representing the first test step, the following override values are to be used (e.g., in any order, in sequential order, in random or non-random order, etc.) in the first test step: an override value of "https://rv32.force.com/ws/oa/token", with can be referred to by an override value identifier "rv32"; an override value of "https://rv33.force.com/ws/oa/token", with can be referred to by an override value identifier "rv33"; and so forth.

In the example test case data set 202 as shown in TABLE 1, the second test data set (204-2) specifies for the second test step: a test step type ("stepType") of "API", a step number ("stepNumber") of "2", an expected time limit (denoted as "timeout") of 60 (e.g., in seconds, etc.), test step specific data fields in accordance with the test step type, and so forth.

The test step specific data fields in the second test step specific data set (204-2) may include but are not necessarily limited to, any of: an HTTP method ("httpMethod") with a value of "GET", a URL ("testUrl") with a value of "https://.force.com/ws/data/vxx.y", an expected response code ("expectedResponseCode") with a value of 200, a form parameter data field ("formParameters"), a header data field (denoted as "header"), and so forth.

The HTTP method, the URL, the header, the form parameter data field may correspond to the same or similarly named fields or components in the second HTTP or REST request to be sent in the second test step. The expected response code 200 is an expected HTTP or REST response code to be received in the second HTTP or REST response sent by a recipient of the second HTTP or REST request in response to the second HTTP request, if the second test step is to be successfully executed within the expected time limit (e.g., 60 seconds, etc.) as specified.

The header data field ("header") in the second test step specific data set (204-2) may comprise one or more header data sub-fields such as an authorization data sub-field (denoted as "Authorization") with a value of "Bearer". This value in the header data field is used in the second HTTP or REST request to signal to the test agent that the access token (or the value of the dependent data field "access_token"), as previously issued by the resource owner to the test agent in the first test step, is to be used for authorization to determine whether the requested resource should be sent back to the test agent as requested by the second HTTP or REST request.

Additionally, optionally or alternatively, the example test case data set 202 as shown in TABLE 1 comprises a test step common data set (e.g., 206, etc.) in lines 2 through 5 and lines 91 through 102.

In some embodiments, the test step common data set (206) comprises test case information, test case owner information, test agent information, zero or more replaceable data field identifiers, and so forth.

The test case owner information may include, but are not necessarily limited to only, any of: the name(s) (denoted as "teamName") of the team(s) that own(s) the test case(s) with a value of "serviceTest", email(s) (denoted as "email") for the team(s) with a value of "serviceTest@force.com", and so forth. The test case owner information may be used by test agent(s) that executes the test case (or any test cases expanded from the test case) to send final test execution status and test results.

The test case information may include, but are not necessarily limited to only, any of: test case name (denoted as "name") with a value of "oauthlogin"; a test case description (denoted as "description") with a value of "Login to Force Endpoint using OAuth with User 1 and check for 200 OK"; a test case status (denoted as "testCaseEnabled") with a value of a Boolean value true; a test case execution period (denoted as "period") with a value of 300 seconds; and so forth.

The test case status ("testCaseEnabled") may be set to true to indicate that the present test case is currently enabled (e.g., is being or is to be scheduled for test execution), or set to false to indicate that the present test case is disabled (e.g., is not to be scheduled for test execution). The test case execution period may be set to a (repetitive) periodic time interval in which the test case is to be executed every so often. For instance, when the test case execution period is set to 300 seconds, the test case is to be repetitively executed every periodic time interval of 300 seconds.

The test agent information may include, but are not necessarily limited to only, any of: a list of test agents to which the test case is to be directed. In the present example, one test agent with an agent identifier (denoted as "agentID") of a value "1" is explicitly identified to execute the test case.

At runtime, the dependency data field "access_token" specified for the first test step is populated with a value extracted in the first test step. For example, the value for the dependency data field "access_token" may be extracted from test results of the first test step such as the first HTTP or REST response in an HTTP or REST API call that is used to execute the first test step, as the value for populating the dependency data field "access_token" is expected to be embedded in the first HTTP or REST response if the response code in the first HTTP or REST response is 200. As previously noted, the value for populating the dependency data field "access_token" may be extracted with a regular expression ("regex") that defines a search pattern with which the value for the dependency data field "access_token" is embedded in the first HTTP or REST response.

The replaceable data field identifiers in the test step common data set (206) identify one or more replaceable data fields in the present test case. For example, in test case data set 202 as illustrated in TABLE 1, the test step common data set (206) includes a replaceable data field identifier of 2 for a replaceable data field. The replaceable data field identifier of 2 represents a unique identifier for a replaceable data object.

In some embodiments, one or more replaceable data objects can exist or live outside a test case object constructed based on a test case data set such as 202. Each of these replaceable data objects may be given a unique object identifier, such as "synthetics\api\replaceables\1", "synthetics\api\replaceables\2", and so forth, in a replaceable data object namespace to distinguish each such replaceable data object from all other replaceable data objects.

The replaceable data field identifier of 2 as specified in test case data set 202 may be received by the test agent as a part of test case data set 202. At runtime, in response to receiving test case data set 202, the test agent can use the replaceable data field identifier of 2 to generate a unique object identifier such as "synthetics\api\replaceables\2" to access a corresponding replaceable data object. The replaceable data object may comprise a key and a list of one or more values. Each value in the list of one or more values in the replaceable data objects may be used to expand the test case (e.g., base, etc.) object representing a generic test case into a test case specific object representing a specific test case.

In the case of multiple replaceable data field identifiers being specified in a test case data set, each replaceable data field identifier in the multiple replaceable data field identifiers may be used by the test agent to generate a replaceable data object identifier to access a respective replaceable data object in multiple replaceable data objects. Each replaceable data object in the multiple replaceable data objects may comprise a respective key and a list of one or more respective values. Each unique combination of values from the multiple replaceable data objects may be used to the test case (e.g., base, etc.) object representing a generic test case into a test case specific object representing a specific test case.

In some embodiments, the test case object implemented by the test agent to represent the test case, or a test step object (e.g., API, method, etc.) therein, may use a placeholder to represent a dependency data field, a overridable data field, a replaceable data field, and so forth, used in the present test case, or the present test step (or the present test step API, method, etc.).

The placeholder may be given a dependency data field identifier (e.g., "access_token", etc.), an overridable data field (e.g., "rv1", "rv2", "rv3", ... "rv33", etc.), a replaceable data field identifier (e.g., 2, etc.), and so forth, which can be identified in test case data set 202.

At runtime, the value of the placeholder may be set by a dependency data field value extracted by a prior/depended test step from test results of the depended test step if the placeholder represents a dependency data field. Additionally, optionally or alternatively, at runtime, the value of the placeholder may be set by an overridable (data field, data sub-field, or parameter) value passed in from test case data set 202 (or test step specific data set(s) therein) if the placeholder represents an overridable data field. Additionally, optionally or alternatively, at runtime, the value of the placeholder may be set by a replaceable data object value (e.g., each value in a list of values in the replaceable data object, etc.) in a replaceable data object outside of the test case object if the placeholder represents a replaceable data field.

In some embodiments, test steps as described herein, such as the first and second test steps in the present example, may be implemented as API call(s), test tool related operations, web browser related operations, and so forth. Under techniques as described herein, each of the test steps may implement any method of (e.g., test, etc.) execution including but not limited to one that is the same as or similar to a method of test execution manually and/or interactively executed by a test user.

Data dependencies between or among the test steps can be defined/specified in test case data set 202, and can be used for automatically executing each of the test steps without any interactive user input. For example, instead of interactive user input, techniques as described can automatically extract test data from a prior test step based on the specified data dependencies and automatically supply the extracted test data to a later test step that needs the data, all without receiving any interactive user input. In contrast, under other approaches that do not implement the techniques as described herein, a test user would have to identify the test data generated in the prior test step at runtime and cause the test data to be used in the later test step through the interactive user input and/or manual operations at runtime.

In this example, the first test step in the test case is to send a first HTTP or REST request based on an HTTP POST method and accompanying authentication and authorization credentials to obtain an access token to a resource from the owner of the resource. The access token may be included in a first HTTP or REST response sent by a recipient of the first HTTP or REST request in response to receiving the first HTTP request. The second test step is to send a second HTTP or REST request based on an HTTP GET method and the access token obtained in the first test step. This second HTTP or REST request is to retrieve the resource in a second HTTP or REST response sent by a recipient of the second HTTP or REST request in response to receiving to the second HTTP request.

In some embodiments, the first test step can be executed with a method that is the same as or similar to that would be executed by a test user. However, instead of the test user noting down the access token at runtime or otherwise causing the access token to be used in the second test step through user interactive input at runtime, under techniques as described herein, the test agent can automatically extract the access token from test data in the first test step based on data dependencies specified in test case data set 202 at runtime, and automatically supply the access token to any method of execution (e.g., API calls, test tool related operations, web browser related operations, etc.) that uses the access token in the second test step, all without any need to receive any user interactive input at runtime.

2.6 Generic and Specific Test Cases

A test case, such as a synthetic web transaction and so forth, may comprise a set of one or more individual test steps. Some or all of the individual test steps in the test case may be executed in any order. Some or all of the individual test steps in the test case may need to be executed in a sequential execution order (or in a sequential execution chain). Test steps that need to be sequentially executed may convey their respective test step execution states including some or all of data in the test steps (e.g., received responses to requests made in a synthetic web transaction, etc.) to other test steps down in the sequential order, for example through data dependencies as discussed. Test steps collectively may be used to assess an overall test execution state (e.g., via a final test case execution status, etc.) of services or applications under test.

In some embodiments, some or all of test steps in a test case may be accompanied with individual timing information in test case data (e.g., test case data set 202, etc.) for the test case. Example individual timing information may include individual allocated time durations (e.g., ten (10) second for the first test step in the first test case, fifteen (15) seconds for the second test step in the third test case, etc.) for respective test steps to complete, specific individual start times for respective test steps to start, specific individual end times for respective test steps to end, and so forth. The individual timing information may be used to schedule the test steps and determined whether any of these test steps has failed by timeout or by any other reason (or exceeding the allocated time durations; or ending after the specified ending times).

Test case data, or test case data set(s) (e.g., 202, etc.) therein, may be represented, without limitation, key-value pairs such as in JSON, markup tags such as in XML, data values in flat file database formats, and so forth. In some embodiments, the test execution engine of the test agent may, but is not limited to, run in JVM. However, it should be noted that any, some or all of techniques as described herein can be implemented in software and/or hardware platforms not necessarily limited to only JVM/Java, and may be implemented in any programming language or platform in addition to or in place of JVM/Java. Likewise, test related data as described herein is independent of, and can be carried in, any particular exchange format such as JSON, YAML (or any markup language), and so forth. The test related data is also independent of, and can operate with, any particular technologies, platforms, programming languages, and so forth, used to implement techniques as described herein.

In some embodiments, test case data sets (e.g., 202) as described herein are delivered or forwarded in a data file such as a JSON file, an XML file, a flat file database, and so forth, to a test agent for executing test cases represented by the test case data sets (e.g., 202, etc.). The test agent, or a test execution engine therein, can use the test case data sets (e.g., 202, etc.) to create test case objects, respectively, for the test cases as represented by the test case data sets (e.g., 202, etc.). In some embodiments, each test case object in the test case objects corresponds to a respective test case in the test cases.

Figure 2B:
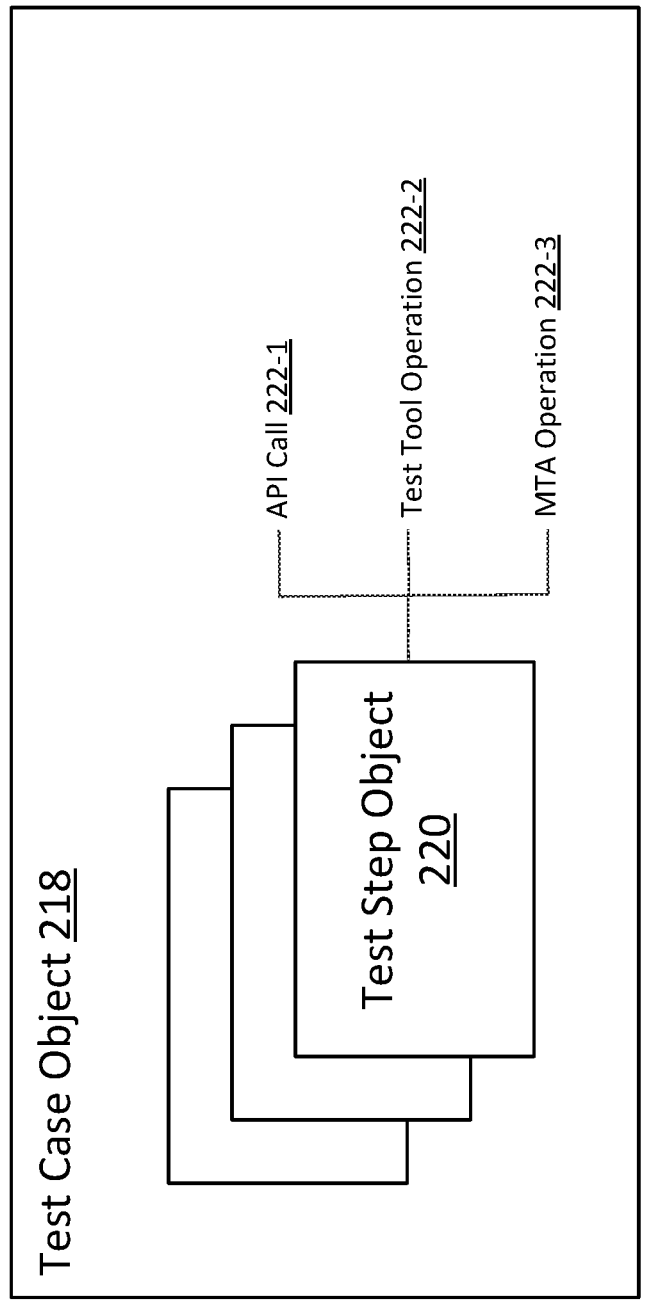
FIG. 2B illustrates an example test case object.

FIG. 2B illustrates an example test case object 218, which is generated base at least in part on a test case data set (e.g., 202 of FIG. 2A, etc.) to represent a test case object. Test case object 218 may be a test case specific object representing a single specific test case, or alternatively may be a test case base object representing a generic test case to be expanded into multiple specific test cases.

Test case object 218 may comprise one or more test step objects (e.g., 220, etc.) each of which represents a test step in the test case. A test step object such as 220 in test case object 218 may implement an API call 222-1, a test tool operation 222-2, an MTA operation 222-3, and so forth.

API call 222-1 may include one or more HTTP or REST-based API calls. For example, as part of executing a test step implementing API call 222-1, one or more HTTP or REST requests based on HTTP or REST templates (with a HTTP method, a URL, a Form Parameters, a Header, etc.) may be generated in the HTTP or REST-based API calls, and sent by the test agent to one or more web server endpoints. Additionally, optionally or alternatively, as part of executing API call 222-1, one or more HTTP or REST responses in compliance with the HTTP or REST templates may be sent by recipient web servers in response to the one or more received HTTP or REST requests, and received by the test agent in the HTTP or REST-based API calls.

Test tool operation 222-2 may include one or more test automation operations. These operations may be performed in conjunction with a test automation tool or a web browser automation tool such as Selenium and so forth.

MTA operation 222-3 may include one or more MTA operations. These operations may be used to support one or more specific message transfer protocols such as Simple Mail Transfer Protocol (SMTP), Post Office Protocol (POP3), Internet Message Access Protocol (IMAP), and so forth.

In some operational scenarios in which specific test cases share commonality such as the same test checks and the same test configurations, a test case base object can be implemented to capture the commonality of the test cases. The test case base object may use placeholders to represent (e.g., possible, potential, etc.) differences among the test cases. At object creation or construction time, the placeholders in the test case base object may be given no values, default values, overridable values, and so forth.

At runtime or in offline processing, the test case base object is used to create the test case specific objects for the specific test cases, for example by deep cloning, by inheritance from the test case base object, and/or by using replaceable data objects as previously discussed. The placeholders in each of the test case specific objects inherited from the test case base object may be populated with test case specific values, for example from replaceable data object(s) as referred to by way of replaceable data field identifier(s) in a test step common data set of the respective test case data set. In some embodiments, the replaceable data object(s) with the test case specific values may, but are not limited to, exist or live outside test case object(s) such as the test case base object.

2.7 Test Case Generator

Figure 3A:
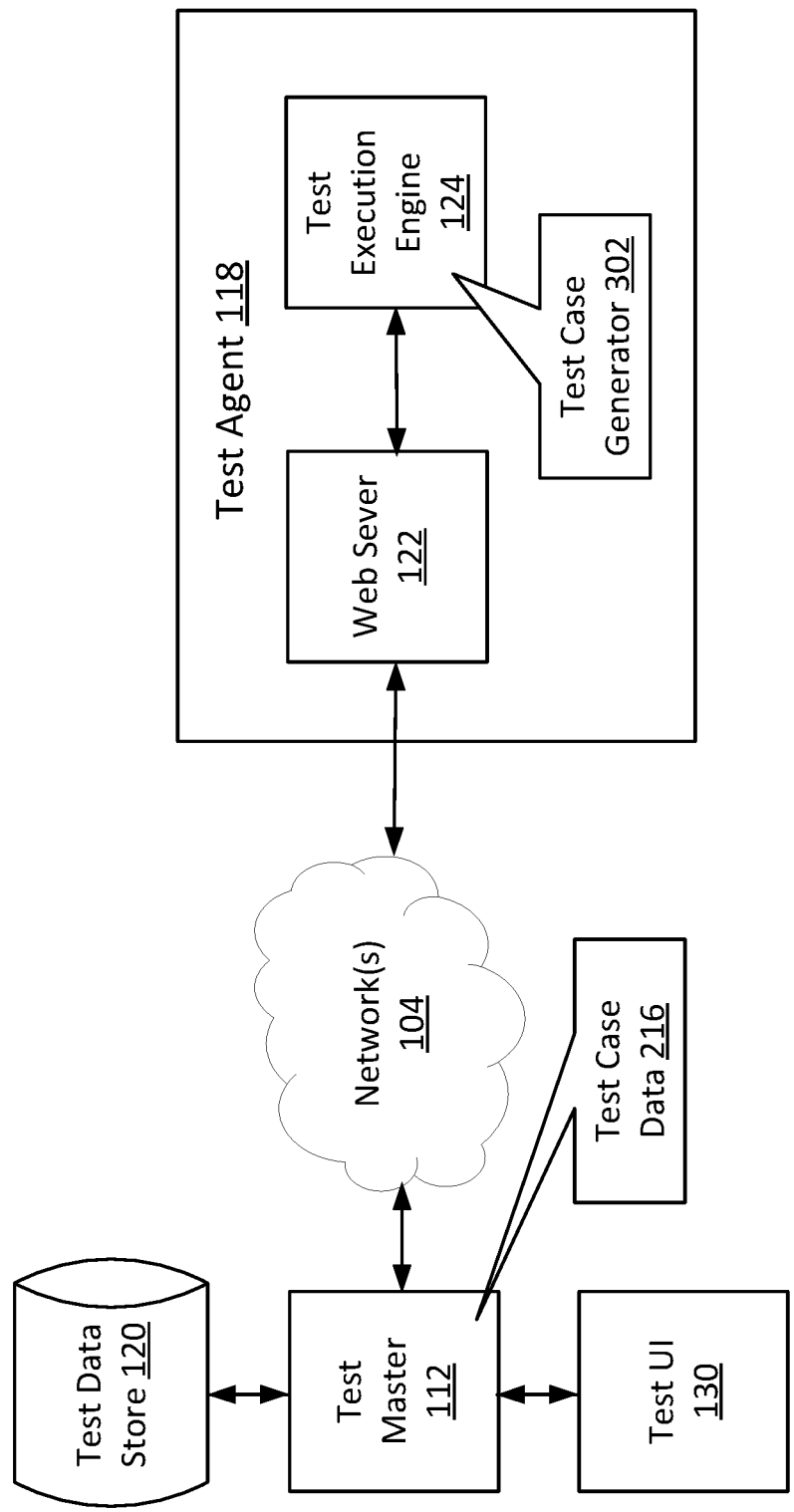
FIG. 3A illustrates an example test case generator.

FIG. 3A illustrates an example test case generator 302. In some embodiments, test case generator 302 can be implemented in a test execution engine (e.g., 124, etc.) of a test agent (e.g., 118, etc.) to generate one or more test case objects (e.g., of a test, etc.) respectively based on one or more test case data sets (e.g., 202, etc.) in test case data 216.

In some embodiments, test case data 216 may be generated and/or stored in a test data store (e.g., 120, etc.) by a test user, by test master 112 interacting with a test user, and so forth. Test master 112 receives/retrieves test case data 216 from the test user and/or from test data store 120, includes test case data 216 in a request for executing a test, and sends the request for executing the test to test agent (e.g., 118, etc.) by way of web server 122.

Test case data 216 may be passed by test master 112 to test agent 118 in payloads (e.g., REST data elements, JSON key-value pairs, a flat file database, etc.) of the request for executing the test that is addressed to a specific endpoint at web server 122. Web server 122 in turn invokes a test execution API corresponding to the specific endpoint and forwarded test case data 216 to test execution engine 124 of test agent 118 in input data/parameters in the test execution API call.

In response to receiving test case data 216, test execution engine 124 delegates to test case generator 302 to use the one or more test case data sets (e.g., 202, etc.) in test case data 216 to generate the one or more test case objects. Test case generator 302 uses test case information, test case owner information, replaceable data field identifier(s), agent information, and so forth, in each of the one or more test case data sets (e.g., 202, etc.) to replace or populate values for test case properties in a respective test case object in the one or more test case objects.

The one or more test case objects represent one or more test cases each of which may be a specific test case on its own right, or (e.g., additionally, operationally, alternatively, etc.) may be a generic test case that can be further expanded by test case generator 302 into a single specific test case or multiple specific test cases. A generic test case as described herein may be expanded, without limitation, based on replaceable data object(s) that are referred to by a test case data set (e.g., 202, etc.) giving rise to the generic test case.

For example, test case generator 302 can use test case data set 200 in the one or more test case data sets (e.g., 202, etc.)

of test case data 216 to generate a test case base object (e.g., 218, etc.) among the one or more test case objects. The test case base object that represents a generic test case can be further expanded into a single test case specific object representing a specific test case or multiple test case specific objects representing multiple specific test cases. More specifically, the test case base object may be expanded, without limitation, based on replaceable data object(s) that are referred to by replaceable data field identifier(s) (e.g., the replaceable data field identifier of 2 in the example as shown in TABLE 1, etc.) in test case data set 202. The test case base object may be expanded into the single test case specific object or the multiple test case specific objects, depending on a total number of unique combinations of values of the replaceable data object(s). Each of the multiple test case specific objects may be generated from the test case base object by deep cloning or by inheritance.

Once test case generator 302 finishes generating all test case specific objects based on the one or more test case data sets (e.g., 202, etc.), test execution engine 124 may schedule or execute specific test cases represented by the test case specific objects, and cause final test case statuses of these specific test cases to be available to test master 112 by way of web server 122, for example as web-based resources (e.g., REST resources, etc.).

Additionally, optionally or alternatively, in some embodiments, after a test case object such as a test case base object, a test case specific object, and so forth, is generated by test case generator 302, the test case object may be partly or in whole cached in memory until specific test case(s) corresponding to the test case object is finished.

2.8 Dependency Relationship

Figure 3B:
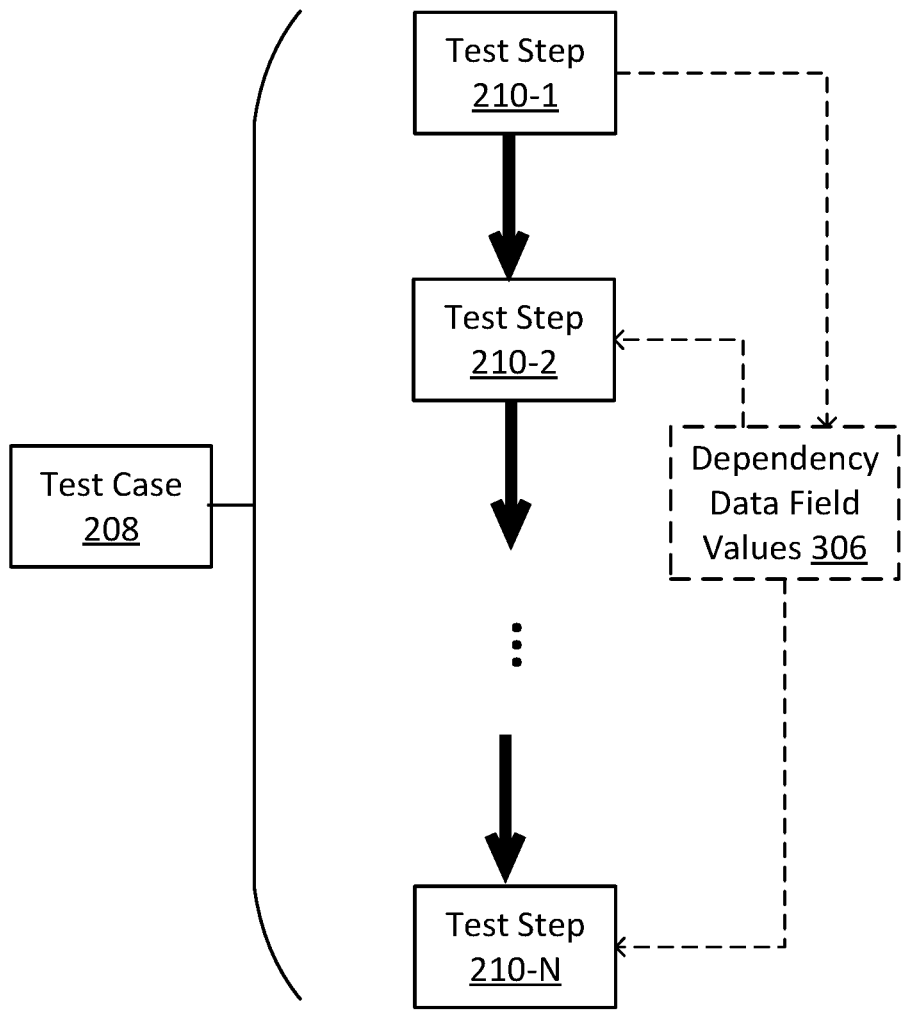
FIG. 3B illustrates an example test case.

FIG. 3B illustrates an example test case 208 represented by a test case object (e.g., 218, etc.) generated based on a test case data set (e.g., 202, etc.). Test case 208 comprises one or more test steps 210-1, 210-2, . . . 210-N, where N is a positive integer no less than one (1). These test steps may be respectively represented by test step objects in or linked to the test case object that represents test case 208.

In some embodiments, in generating the test case object that represents test case 208, test case generator 302 uses one or more test step data sets (e.g., 204-1, 204-2, etc.) in test case data set 202 to generate the one or more test step objects that represent the one or more test steps (e.g., 210-1, 210-2, . . . 210-N, etc.) of test case 208.

Test case generator 302 uses a test step type, a step number, an expected time limit, test step specific data field(s), dependency data field(s), replaceable override data field(s), and so forth, in each test step data set in the one or more test step data sets (e.g., 204-1, 204-2, etc.) to replace or populate values for test step properties in a respective test step object in the one or more test step objects of the test case object that represents test case 208, to select/generate API calls (or methods) based at least in part on each such test step data set (e.g., 204-1, 204-2, etc.), etc. The API calls (or methods) selected or generated for each such test step object may be used to execute a test step represented by the respective test step object.

An API call (or method) in a test step (e.g., 210-1, 210-2, . . . 210-N, etc.) can be further expanded by a test execution engine (e.g., 124, etc.) as described herein into one or more specific instances. The API call (or method) may be expanded, without limitation, based on replaceable overridable data object(s) that are referred to by the replaceable overridable data field(s) in a test step data set (e.g., 204-1, 204-2, etc.) giving rise to the test step that is to execute the API call (or method).

For example, test execution engine 124 can use values specified in the replaceable overridable data field(s) (e.g., the replaceable overridable data field(s) in the example as shown in TABLE 1, etc.) in test step data set 204-1 to expand into multiple instances of an HTTP or REST API. Each of these instances of the HTTP or REST API may use a specific combination of values of form parameters and URLs to send a respective endpoint of a respective web server to obtain a respective access token by way of the respective web server.

Under techniques as described herein, some or all of test steps 210-1, 210-2, . . . 210-N can access test data generated from other previously executed test steps in test steps 210-1, 210-2, . . . 210-N. For example, test execution engine 124 can use the dependency data field(s) (e.g., the dependency data field(s) in the example as shown in TABLE 1, etc.) in test step data set 204-1 to identify what test data are to be extracted by the first test step 210-1.

In the present example, access tokens from all the instances of the HTTP or REST API as executed for test case 208 may be extracted from HTTP or REST responses received by way of the web servers tow which HTTP or REST requests are sent by the first test step 210-1. These access tokens may be automatically cached or stored by the first test step 210-1 as dependency data field values 306 and automatically made available to subsequent test step(s) such as 210-2, . . . 210-N, all without receiving any prompt from a test user. It should be noted that generally speaking, a dependency data field value such as 306 may be extracted from an operation that is not necessarily limited to one that is based on HTTP or REST API. Additionally, optionally or alternatively, a dependency data field value such as 306 may be an access token or a data value other than access token. A dependency data field value as described herein may be utilized by subsequent steps that may or may not involve HTTP or REST APIs to complete an overall transaction. For instance, in executing the second test step 210-2, the access tokens in dependency data field values 306 may be accessed by any HTTP or REST API (or method), any non-HTTP operations, and so forth, implemented in the second test step 210-2 and used by the HTTP or REST API (or method), the non-HTTP operations, and so forth, implemented in the second test step 210-2 to access or obtain resources with the access tokens obtained in the separate HTTP or REST API as executed in the first test step 210-1.

In some embodiments, each of test steps in a test case as described herein performs stateless HTTP- or REST-based operation(s) based on HTTP or RESP API(s) that are (e.g., completely, etc.) independent of stateless HTTP- or REST-based operation(s) based on HTTP or RESP API(s) in another test step. As used herein, the phrase "an HTTP or RESP API in one test step independent of another HTTP or RESP API in another test step" means that these APIs may be free to implement their respective methods of execution for testing purposes without being required to pass data in API arguments, input parameters, environment variables, pointers, and so forth, associated with these API calls. It should be noted that techniques as described herein can operate with API calls that are independent as well as API calls that are dependent. For example, the same data extraction and sharing method based on data dependency specified in a test case data set can be used for API calls, test tool related operations, web browser related operations, and so forth, that are dependent.

Accordingly, it is difficult to execute a workflow or a transaction that may involve a number of independent HTTP or RESP API(s) in multiple test steps of a test case. When HTTP or RESP requests and responses are initiated or monitored by a user. The user can take note of related data between multiple test steps or multiple API calls therein, and help facilitate executing such a workflow or transaction through a user interactive test execution mechanism at runtime of executing the test case.

Techniques as described herein can be used to execute workflows or transactions in a test case automatically in a stateless test execution framework, without any interaction with a test master and/or without any interaction with a test user while the test case is being executed. For example, dependency data fields can be represented in a test case data set for the test case. At runtime, a test agent, or a test execution engine therein, can automatically extract test data from test results of APIs (which are independent) in a previously executed test step and make the extracted test data available to APIs (which are independent) in a later executed test step. As a result, based on the dependency data fields defined in the test case data set, techniques as described herein allow data extracted form a previous test step and delivered to later test step(s), even though the underlying API calls are independent of one another. The techniques can be used to support creating or executing a workflow or transaction to do what a user can with a user interactive test execution mechanism.

For the purpose of illustration only, it has been described that dependency relationships (e.g., data dependencies, etc.) between different test steps in a test case may be represented in a data file that defines a test case data set for the test case. It should be noted that, in various embodiments, dependency relationships as described herein may be defined between two stateless transactions within or without a test step, between a stateless transaction and a stateful transaction within or without a test step, between two stateful transactions within or without a test step, and so forth. In an example, in some embodiments in which API calls are not independent (e.g., an API call explicitly invokes another API, etc.), a dependency relationship between the two API calls may be externalized and represented in a test data file as a data dependency as described herein, in addition to or in place of data and parameter passing provided in the invocation mechanism of API calls. In another example, in some embodiments in which a test step implements multiple API calls, dependency relationships between or among the multiple API calls may be externalized and represented in a test data file as a data dependency as described herein. Additionally, optionally or alternatively, dependency relationships may be defined between and among operations associated with test tools, operations associated with web browsers, API calls, and so forth, between different test steps and within or without a test step.

Example tests as described herein may include, but are not necessarily limited to only, those related to any of: production system functionality, system functionality in various stages of development and/or test phases, functionality related to user experiences, checking login pool, orchestration of multiple services, accesses to multiple data centers and/or data stores, system or service health checks, ping checks, transactions, account creation, reporting software, results analysis, alerting, visualization, multi-step tests, data creation tests, data deletion tests, data entry tests, complicated and/or uncomplicated transactions, services exposed to user systems, internal services not exposed to user systems, HTTP-based operations, UI related functionality, web-based accesses, SMTP-based operations, FTP-based operations, network functionality, real-time operations, near-real-time operations, non-real-time operations, and so forth.

3.0 Example Embodiments

Figure 4:
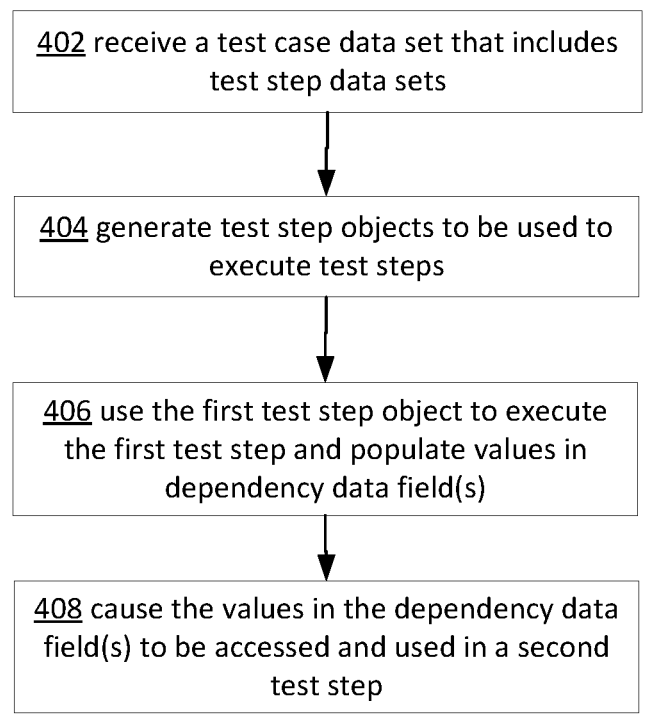
FIG. 4 illustrates an example process flow.

FIG. 4 illustrates an example process flow that may be implemented by a computing system (or device) as described herein. In block 402, a test execution engine (e.g., 124 of FIG. 1B, etc.) operating with a test agent (e.g., 118 of FIG. 1B, 118-1 through 118-N of FIG. 1A, etc.) receives a test case data set that includes one or more test step data sets. The test step data sets comprises a first test step data set that specifies a dependency data field.

In block 404, the test execution engine generates, based at least in part on the test step data sets in the test case data set, one or more test step objects to be used to execute one or more test steps in a test case. The test steps comprises a first test step to be executed using a first test step object in the test step objects. The first test step object is generated based at least in part on the first test step data set that specifies the dependency data field.

In block 406, the test execution engine uses the first test step object to execute the first test step. The first test step as executed populates one or more values in the dependency data field.

In block 408, the test execution engine causes the one or more values in the dependency data field to be accessed and used in a second test step in the test steps while the second test step is being executed using a second test step object in the test step objects.

In an embodiment, the first test step executes one or more first API calls; the second test step executes one or more second API calls; the one or more first API calls are independent of the one or more second API calls.

In an embodiment, the one or more first API calls do not invoke the one or more second API calls; the one or more first API calls do not directly pass any input data to the one or more second API calls.

In an embodiment, the test case is represented by a test case object generated based on the test case data set.

In an embodiment, the test case is represented by a test case object generated based on expanding a test case generic object; the test case generic object is generated based on the test case data set.

In an embodiment, the test step data sets comprises a test step data set that specifies one or more values for a replaceable overridable data field; the one or more values for the replaceable overridable data field are used to perform one or more corresponding operations respectively based on the one or more values for the replaceable overridable data field.

In an embodiment, the test case data set comprises a set of test step common data set with data elements common to all test step in the test steps.

In an embodiment, the method is performed by a test agent; the test case data set is generated by a test user interacting with a test master; the test case data set is sent by the test master to the test agent, in a request for executing a test that includes the test case.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
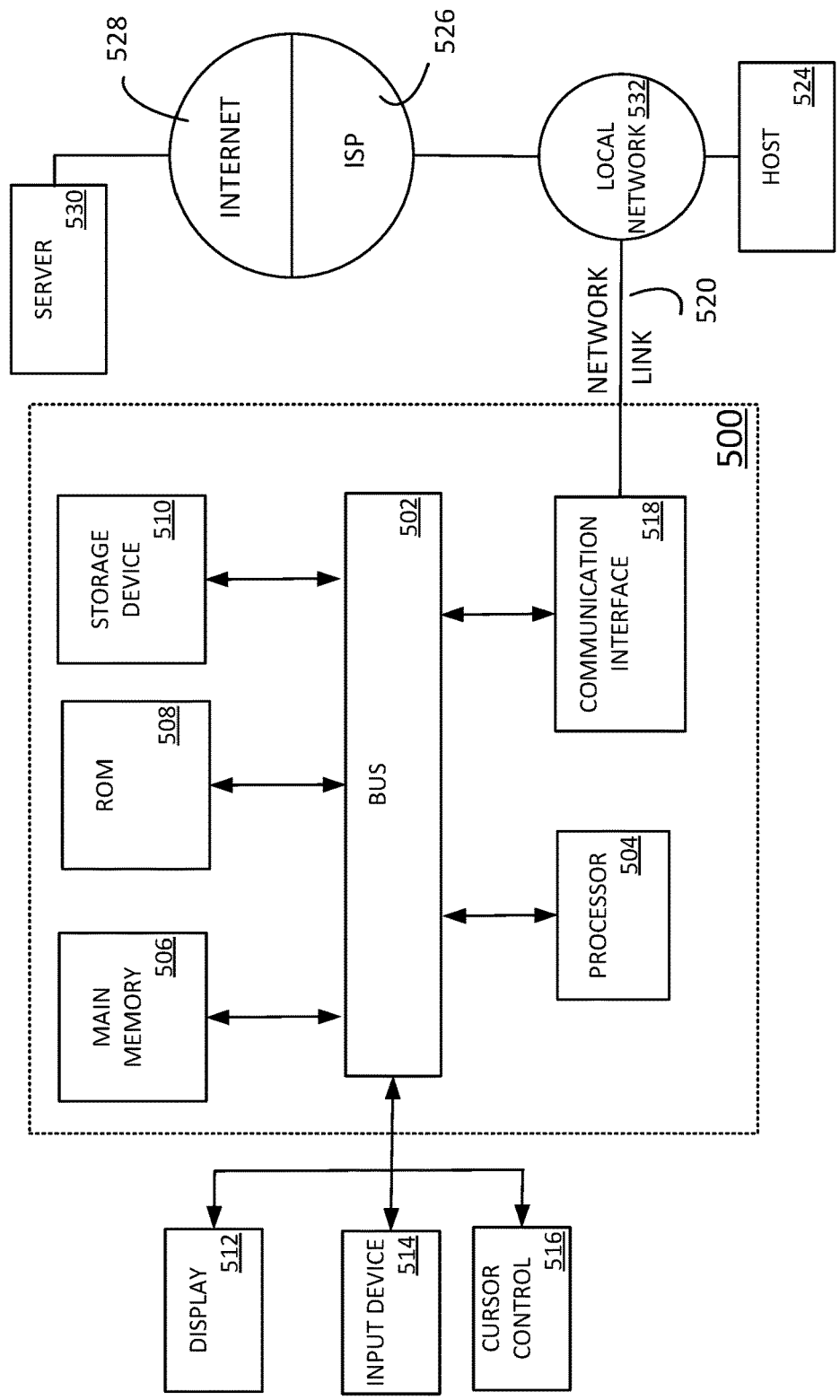
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   receiving a test case data set that includes test step data sets, the test step data sets comprising a first test step data set that specifies a dependency data field;
   generating, based at least in part on the test step data sets in the test case data set, test step objects to be used to execute test steps in a test case, the test steps comprising a first test step to be executed using a first test step object in the test step objects, the first test step object being generated based at least in part on the first test step data set that specifies the dependency data field;
   using the first test step object to execute the first test step, the first test step as executed populating one or more values in the dependency data field;
   causing the one or more values in the dependency data field to be accessed and used in a second test step in the test steps while the second test step is being executed using a second test step object in the test step objects.

2. The method as recited in claim 1, wherein the first test step executes one or more first API calls, wherein the second test step executes one or more second API calls, and wherein the one or more first API calls are independent of the one or more second API calls.

3. The method as recited in claim 2, wherein the one or more first API calls do not invoke the one or more second API calls, and wherein the one or more first API calls do not directly pass any input data to the one or more second API calls.

4. The method as recited in claim 1, wherein the test case is represented by a test case object generated based on the test case data set.

5. The method as recited in claim 1, wherein the test case is represented by a test case object generated based on expanding a test case generic object, and wherein the test case generic object is generated based on the test case data set.

6. The method as recited in claim 1, wherein the test step data sets comprises a test step data set that specifies one or more values for a replaceable overridable data field, and wherein the one or more values for the replaceable overridable data field are used to perform one or more corresponding operations respectively based on the one or more values for the replaceable overridable data field.

7. The method as recited in claim 1, wherein the test case data set comprises a set of test step common data set with data elements common to all test step in the test steps.

8. The method as recited in claim 1, wherein the method is performed by a test agent, wherein the test case data set is generated by a test user interacting with a test master, and wherein the test case data set is sent by the test master to the test agent, in a request for executing a test that includes the test case.

9. One or more non-transitory computer readable media storing a program of instructions that is executable by a device to perform:
   receiving a test case data set that includes test step data sets, the test step data sets comprising a first test step data set that specifies a dependency data field;
   generating, based at least in part on the test step data sets in the test case data set, test step objects to be used to execute test steps in a test case, the test steps comprising a first test step to be executed using a first test step object in the test step objects, the first test step object being generated based at least in part on the first test step data set that specifies the dependency data field;
   using the first test step object to execute the first test step, the first test step as executed populating one or more values in the dependency data field;
   causing the one or more values in the dependency data field to be accessed and used in a second test step in the test steps while the second test step is being executed using a second test step object in the test step objects.

10. The medium as recited in claim 9, wherein the first test step executes one or more first API calls, wherein the second test step executes one or more second API calls, and wherein the one or more first API calls are independent of the one or more second API calls.

11. The medium as recited in claim 10, wherein the one or more first API calls do not invoke the one or more second API calls, and wherein the one or more first API calls do not directly pass any input data to the one or more second API calls.

12. The medium as recited in claim 9, wherein the test case is represented by a test case object generated based on the test case data set.

13. The medium as recited in claim 9, wherein the test case is represented by a test case object generated based on expanding a test case generic object, and wherein the test case generic object is generated based on the test case data set.

14. The medium as recited in claim 9, wherein the test step data sets comprises a test step data set that specifies one or more values for a replaceable overridable data field, and wherein the one or more values for the replaceable overridable data field are used to perform one or more corresponding operations respectively based on the one or more values for the replaceable overridable data field.

15. The medium as recited in claim 9, wherein the test case data set comprises a set of test step common data set with data elements common to all test step in the test steps.

16. The medium as recited in claim 9, wherein the method is performed by a test agent, wherein the test case data set is generated by a test user interacting with a test master, and wherein the test case data set is sent by the test master to the test agent, in a request for executing a test that includes the test case.

17. A system, comprising:
one or more computing processors;
one or more non-transitory computer readable media storing a program of instructions that is executable by the one or more computing processors to perform:
receiving a test case data set that includes test step data sets, the test step data sets comprising a first test step data set that specifies a dependency data field;
generating, based at least in part on the test step data sets in the test case data set, test step objects to be used to execute test steps in a test case, the test steps comprising a first test step to be executed using a first test step object in the test step objects, the first test step object being generated based at least in part on the first test step data set that specifies the dependency data field;
using the first test step object to execute the first test step, the first test step as executed populating one or more values in the dependency data field;
causing the one or more values in the dependency data field to be accessed and used in a second test step in the test steps while the second test step is being executed using a second test step object in the test step objects.

18. The system as recited in claim 17, wherein the first test step executes one or more first API calls, wherein the second test step executes one or more second API calls, and wherein the one or more first API calls are independent of the one or more second API calls.

19. The system as recited in claim 18, wherein the one or more first API calls do not invoke the one or more second API calls, and wherein the one or more first API calls do not directly pass any input data to the one or more second API calls.

20. The system as recited in claim 17, wherein the test case is represented by a test case object generated based on the test case data set.

21. The system as recited in claim 17, wherein the test case is represented by a test case object generated based on expanding a test case generic object, and wherein the test case generic object is generated based on the test case data set.

22. The system as recited in claim 17, wherein the test step data sets comprises a test step data set that specifies one or more values for a replaceable overridable data field, and wherein the one or more values for the replaceable overridable data field are used to perform one or more corresponding operations respectively based on the one or more values for the replaceable overridable data field.

23. The system as recited in claim 17, wherein the test case data set comprises a set of test step common data set with data elements common to all test step in the test steps.

24. The system as recited in claim 17, wherein the method is performed by a test agent, wherein the test case data set is generated by a test user interacting with a test master, and wherein the test case data set is sent by the test master to the test agent, in a request for executing a test that includes the test case.

\* \* \* \* \*